(12) United States Patent
Stracener et al.

(10) Patent No.: US 10,690,091 B2
(45) Date of Patent: Jun. 23, 2020

(54) FRAGMENTING NOZZLE SYSTEM

(71) Applicant: Aerojet Rocketdyne, Inc., Sacramento, CA (US)

(72) Inventors: Phillip Stracener, Gainsville, VA (US); Mark S. Derstine, Gainsville, VA (US); John Mendillo, Jupiter, FL (US)

(73) Assignee: Aerojet Rocketdyne, Inc., Jupiter, FL (US)

( * ) Notice: Subject to any disclaimer, the term of this patent is extended or adjusted under 35 U.S.C. 154(b) by 190 days.

(21) Appl. No.: 15/762,735

(22) PCT Filed: Oct. 19, 2016

(86) PCT No.: PCT/US2016/057603
§ 371 (c)(1),
(2) Date: Mar. 23, 2018

(87) PCT Pub. No.: WO2017/078931
PCT Pub. Date: May 11, 2017

(65) Prior Publication Data
US 2018/0298847 A1 Oct. 18, 2018

Related U.S. Application Data

(60) Provisional application No. 62/252,269, filed on Nov. 6, 2015.

(51) Int. Cl.
*F02K 9/97* (2006.01)
*F02K 7/18* (2006.01)
*F02K 9/32* (2006.01)

(52) U.S. Cl.
CPC ............... *F02K 9/978* (2013.01); *F02K 7/18* (2013.01); *F02K 9/32* (2013.01); *F02K 9/97* (2013.01);
(Continued)

(58) Field of Classification Search
CPC ...... F02K 9/97; F02K 9/976978; F02K 9/976; F02K 9/978
See application file for complete search history.

(56) References Cited

U.S. PATENT DOCUMENTS 3,372,548 A * 3/1968 Mathis .................. F02K 9/97
60/771
3,648,461 A * 3/1972 Bailey .................. F02K 9/32
60/770

(Continued)

FOREIGN PATENT DOCUMENTS

GB 2106988 4/1983

OTHER PUBLICATIONS

International Preliminary Report on Patentability for PCT Application No. PCT/US2016/057603, dated May 17, 2018.
(Continued)

*Primary Examiner* — Todd E Manahan
*Assistant Examiner* — Kyle Robert Thomas

(57) ABSTRACT

A rocket motor includes a case and first and second nozzles in the case. The first nozzle is disposed in the second nozzle. The first nozzle includes a forward leg, a rear leg, and an intermediate leg. The intermediate leg has a convex conical geometry, and the forward leg has a forward lip that is spaced from the case. The rear leg has a rear lip that is spaced from the case. The forward leg and the rear leg at least partially define a flow passage through the first nozzle. The first nozzle is exclusively secured by the intermediate leg to at least one of the case or the second nozzle. At least a portion of a fragmentation system is disposed between the first and second nozzles.

15 Claims, 3 Drawing Sheets

(52) U.S. Cl.
CPC .............. *F02K 9/974* (2013.01); *F02K 9/976* (2013.01); *F05D 2220/10* (2013.01); *F05D 2250/90* (2013.01)

(56) References Cited

U.S. PATENT DOCUMENTS

| | | | | |
|---|---|---|---|---|
| 3,946,557 | A * | 3/1976 | Macbeth | F02K 9/346 60/253 |
| 4,022,129 | A * | 5/1977 | Day | F02K 9/978 102/378 |
| 5,779,151 | A | 7/1998 | Sutton | |
| 6,651,438 | B2 * | 11/2003 | McGrath | F02K 9/80 239/265.19 |
| 2003/0046922 | A1 * | 3/2003 | McGrath | F02K 9/80 60/253 |

OTHER PUBLICATIONS

International Search Report or International Patent Application No. PCT/US2016/057603 dated Jan. 20, 2017.

* cited by examiner

US 10,690,091 B2

FRAGMENTING NOZZLE SYSTEM

CROSS-REFERENCE TO RELATED APPLICATIONS

The present disclosure claims priority to U.S. Provisional Patent Application No. 62/252,269, filed Nov. 6, 2015.

BACKGROUND

This disclosure relates to propulsion systems and, more particularly, to a nozzle. Nozzles are used in propulsion systems, such as rocket motors, to provide a flow path for a propellant or propellants. Generally, the propellant expands through the nozzle to provide reaction forces, pressure, or thrust.

SUMMARY

A rocket motor according to an example of the present disclosure includes a case and a nozzle system that has first and second nozzles disposed in the case. The first nozzle is at least partially disposed in the second nozzle. The first nozzle has a forward leg, a rear leg, and an intermediate leg between the forward leg and the rear leg. The intermediate leg has a convex conical geometry. The forward leg has a forward lip that is spaced from the case such that there is a forward gap between the forward lip and the case. The rear leg has a rear lip that is spaced from the case such that there is a rear gap between the rear lip and the case. The forward leg and the rear leg at least partially define a flow passage through the first nozzle. The first nozzle is exclusively secured by the intermediate leg to at least one of the case or the second nozzle. A fragmentation system has a portion at least partially disposed between the first and second nozzles.

In a further embodiment of any of the foregoing embodiments, the forward gap is radially larger than the rear gap.

In a further embodiment of any of the foregoing embodiments, the intermediate leg has an intermediate lip that is axially closer to the rear lip than to the forward lip.

In a further embodiment of any of the foregoing embodiments, the first nozzle is formed of a material selected from the group consisting of ceramic materials, graphite materials, and combinations thereof.

In a further embodiment of any of the foregoing embodiments, the fragmentation system includes an energetic material disposed between the first and second nozzles.

In a further embodiment of any of the foregoing embodiments, the energetic material abuts the intermediate leg.

In a further embodiment of any of the foregoing embodiments, the energetic material is disposed between the forward leg and the intermediate leg.

A nozzle system according to an example of the present disclosure includes a nozzle circumscribing an axis. The nozzle is formed of a brittle material and has a convergent leg, a divergent leg, and an intermediate leg between the convergent leg and the divergent leg. The convergent leg and the divergent leg at least partially define a flow passage through the nozzle.

A further embodiment of any of the foregoing embodiments includes an ignition system, at least a portion of which is disposed adjacent the intermediate leg.

In a further embodiment of any of the foregoing embodiments, the ignition system includes an energetic material that is disposed between the forward leg and the intermediate leg.

In a further embodiment of any of the foregoing embodiments, the intermediate leg has a convex conical surface.

In a further embodiment of any of the foregoing embodiments, the brittle material selected from the group consisting of ceramic materials, graphite materials, and combinations thereof.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
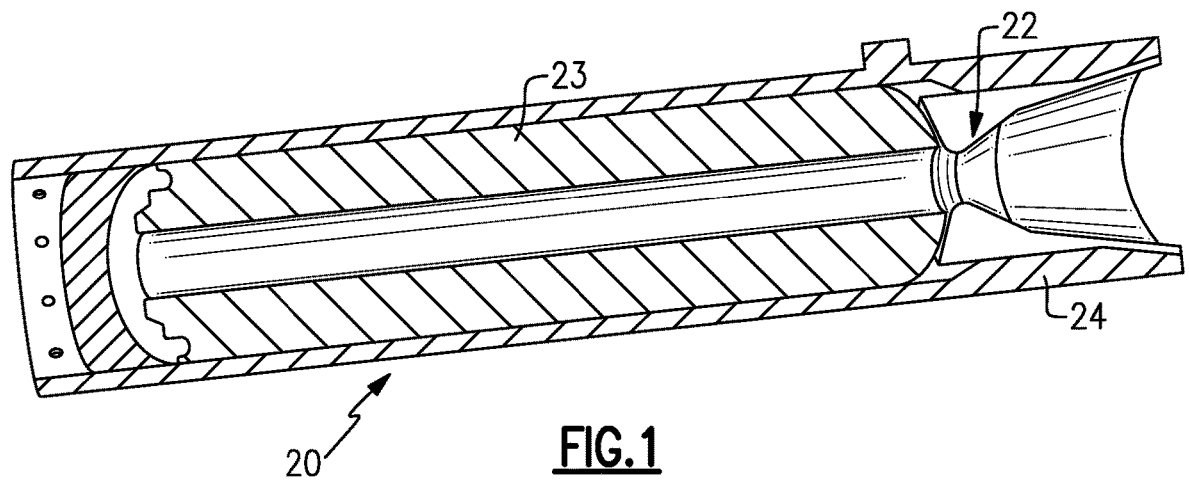
FIG. 1 illustrates an example rocket motor that has a fragmenting nozzle system.

FIG. 1 schematically illustrates a longitudinal cross-section through an example rocket motor 20 that has a fragmentable or fragmenting nozzle system 22. Although not limited, the rocket motor 20 may be a rocket booster that includes a solid fuel gas generator, such as a solid propellant grain 23 contained within the ramjet combustor that produces exhaust gases through the fragmenting nozzle system 22 to provide thrust. The examples herein are not limited to rocket motors and may be implemented in other types of vehicles. As will be described, the fragmenting nozzle system 22 enables dual mode operation using different nozzle throat geometries, as well as the ability to rapidly change from one mode to the other. For example, the modes of operation are different pressure modes for flow through the fragmenting nozzle system 22.

Figure 2:
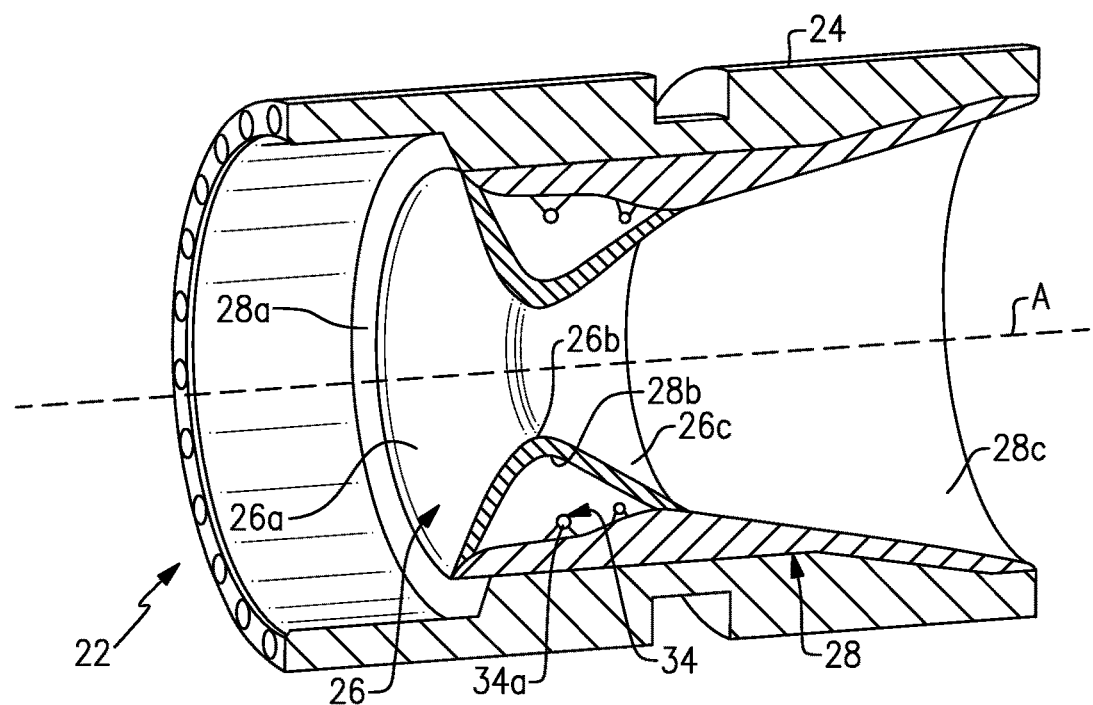
FIG. 2 illustrates a cross-section through a portion of the rocket motor and fragmenting nozzle system of FIG. 1.

FIG. 2 illustrates an isolated view of a cross-section through a portion of the rocket motor 20 and the fragmenting nozzle system 22. In this example, the fragmenting nozzle system 22 is within a case 24 of the rocket motor 20. The fragmenting nozzle system 22 includes a first (or inner) nozzle 26 and a second (or outer) nozzle 28. Each of the nozzles 26/28 are convergent-divergent nozzles (with regard to left-to-right flow in FIG. 2). The first nozzle 26 is located at least partially within the second nozzle 28. In this regard, the first nozzle 26 lines the interior of the second nozzle 28, although the axial lengths of the nozzles 26/28 may differ. The first nozzle 26, the second nozzle 28, or both may be fabricated from two or more arc segments.

The nozzles 26/28 include, respectively, convergent sections 26a/28a that narrow to respective throat sections 26b/28b that expand to respective divergent sections 26c/28c. As shown, the throat sections 26b/28b have different geometries with regard to at least minimum diametric size. The nozzles 26/28 may alternatively or additionally differ in other flow path geometries, such as the geometries of the throat angles with regard to the slope angles of the convergent sections 26a/28a and divergent sections 26c/28c to a plane that is perpendicular to the central axis A of the nozzles 26/28.

At least a portion of an ignitor or fragmentation system 34 is situated between the first and second nozzles 26/28 in this example. The fragmentation system 34 is operable to fragment the first nozzle 26. For instance, the fragmentation system 34 includes an energetic material 34a, such as but not limited to an ignition cord, that is situated between the first and second nozzles 26/28. As an example, the ignition cord can be a flexible tube filled with an explosive, such as pentaerythritol tetranitrate (PETN). One non-limiting example cord is ITLX®. Other portions of the fragmentation system 34, such as electronics, if used, may be located elsewhere.

The first nozzle 26 is formed of a brittle, fragmentable or fragmenting material. The second nozzle 28 may be formed of a fragment- or pressure-resistant material. A fragmentable or fragmenting material substantially breaks apart into many small pieces or disintegrates to powder upon activation of the fragmentation system 34 to produce a pressure wave. A fragment-resistant material does not break apart from the pressure wave. For example, the second nozzle 28 substantially maintains its geometric profile after the pressure wave.

Upon selective triggering of the fragmentation system 34, the first nozzle 26 rapidly fragments and is shed or expelled from the rocket motor 20. For instance, the first nozzle 26 breaks apart into very small pieces that are no larger than approximately 3.5 inches and some of which are powder-sized; and within a period of less than 5 milliseconds the first nozzle 26 fragments and completely or substantially completely expels from the rocket motor 20. In further examples, the first nozzle 26 breaks apart into pieces that have a maximum dimension that is smaller than the minimum diametric size of the throat section 26b, to ensure that the pieces can be rapidly expelled.

The shedding of the first nozzle 26 rapidly exposes the different nozzle geometry of the second nozzle 28. Thus, the fragmenting nozzle system 22 can initially be used in a first operation mode, such as for a first operation pressure. The first nozzle 26 can then be removed or shed using the fragmentation system 34 such that the fragmenting nozzle system 22 can then be used in a second operation mode, such as for a second operation pressure. Moreover, since the fragmenting and expelling of the first nozzle is rapid, an operator can near-instantaneously change from the first mode of operation to the second.

In further examples, the first mode is a rocket boost mode to accelerate the rocket or vehicle, and the second mode is a sustain mode to maintain thrust or speed. The boost mode may utilize the solid propellant grain 23, while the sustain mode may utilize ramjet combustion. For instance, a pyrotechnic ignitor lights the solid propellant grain 23. The grain 23 burns and sends hot gases through the first nozzle 26 to accelerate the rocket to cruise speed. As the grain burns out, the pressure of the hot gases flowing through the first nozzle 26 decreases. The decrease triggers the fragmentation system 34 and fragments the first nozzle 26 into small pieces, which are rapidly expelled from the back of the fragmenting nozzle system 22 to expose the geometry of the second nozzle 28 and transition into the sustain mode. In the sustain mode the second nozzle 28 serves as a combustion chamber where hot gases produced by a gas generator propellant mix with air from a port cover to generate hot combustion gases through the second nozzle 28. In this regard, the divergent section 28c of the second nozzle 28 serves as a ramjet nozzle.

Figure 3:
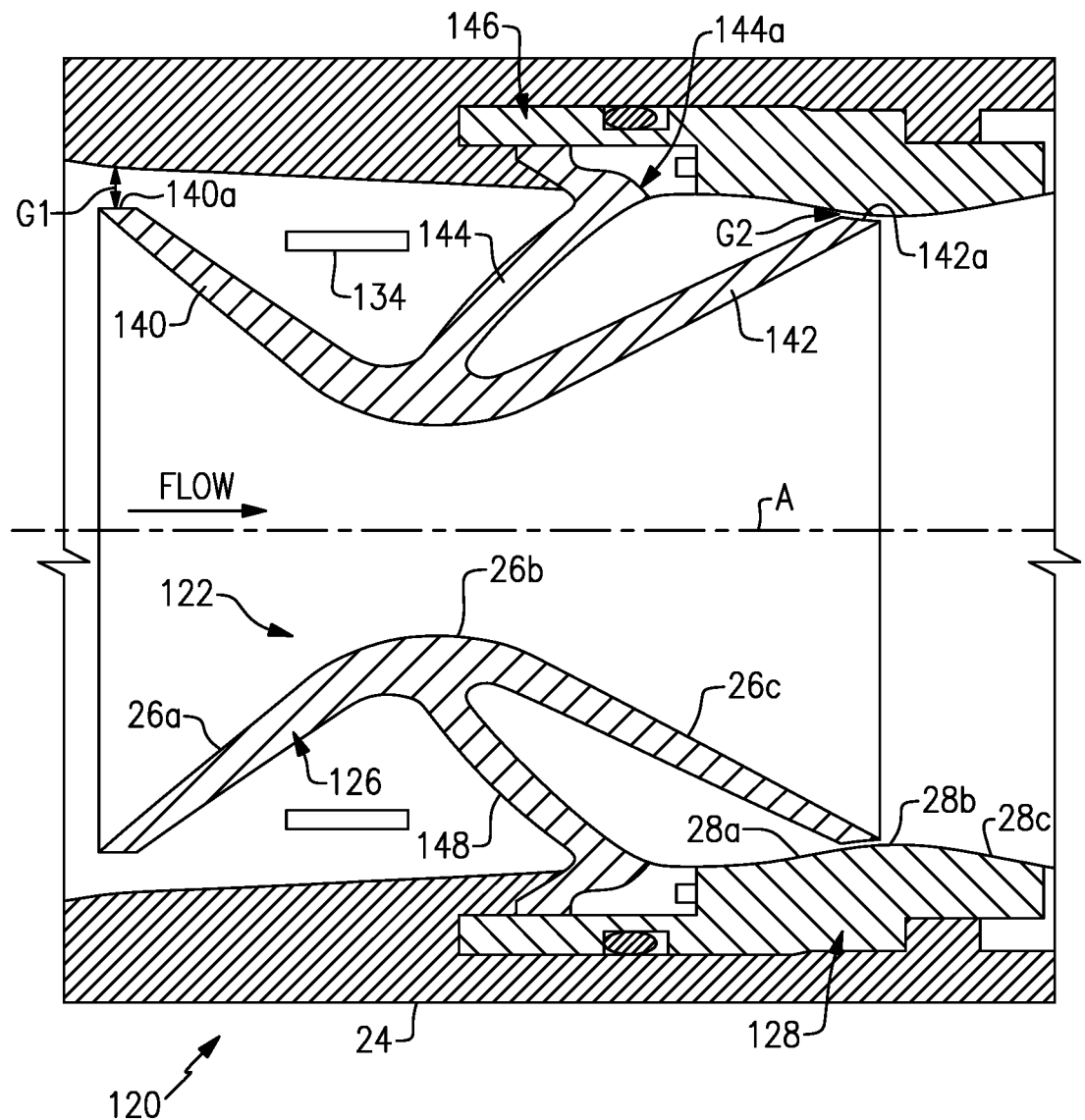
FIG. 3 illustrates another example of a rocket motor and fragmenting nozzle system.

FIG. 3 illustrates a portion of another example rocket motor 120 and fragmenting nozzle system 122. In this disclosure, like reference numerals designate like elements where appropriate and reference numerals with the addition of one-hundred or multiples thereof designate modified elements that are understood to incorporate the same functions, features, and benefits of the corresponding elements. The first nozzle 126 is at least partially disposed in the second nozzle 128. The first nozzle 126 includes a forward leg 140, a rear leg 142, and an intermediate leg 144 between the forward leg 140 and the rear leg 142. The forward leg 140 generally has the shape of a frustum and forms the convergent section 26a. The rear leg 142 also has the shape of a frustum and forms the divergent section 26c. The forward leg 140 and the rear leg 142 thus at least partially define the flow passage through the first nozzle 126.

At least a portion of an ignitor or fragmentation system 134 is disposed between the first and second nozzles 126/128. In this example, the fragmentation system 134 is in the volume between the forward leg 140 and the intermediate leg 144 but may alternatively or additionally be between the intermediate leg 144 and the rear leg 142.

The first nozzle 126 is mounted via the intermediate leg 144. For example, the first nozzle 126 is exclusively secured by the intermediate leg 144 to at least one of the case 24 or the second nozzle 128. For instance, the intermediate leg 144 fits into a mechanical joint 146 to secure the first nozzle 126 in the proper position. The mechanical joint 146 can be on the second nozzle 128, on the case 24, or on the second nozzle 128 and the case 24.

The intermediate leg 144 is the sole support for the first nozzle 126. In this regard, the intermediate leg 144 is also configured to bear and transmit reaction forces of the first nozzle 126. For instance, the intermediate leg 144 has a "domed" or convex conical geometry 148 that slopes rearwards. The geometry serves to place the intermediate leg 144 in compression when transmitting reaction forces during use. The reaction forces are transmitted through the intermediate leg 144 to the case 24.

The forward leg 140 and the rear leg 142 are cantilevered from the intermediate leg 144 and thus do not seal or mount to the case 24. For instance, the forward leg 140 has a forward lip 140a that is spaced from the case 24 such that there is a forward gap G1 between the forward lip 140a and the case 24. Similarly, the rear leg 142 has a rear lip 142a that is spaced from the case 24 such that there is a rear gap G2 between the rear lip 142a and the case 24. The intermediate leg 144 has an intermediate lip 144a that is axially closer to the rear lip 142a than to the forward lip 140a because of the slope of the intermediate leg 144. The intermediate lip 144a may be configured to fit with the mechanical joint 146.

The gaps G1/G2 permit flow into, respectively, the volume between the forward and intermediate legs 140/144 and the volume between the intermediate and rear legs 144/142. The flow into these volumes serves to balance pressure across the walls of the first nozzle 126. In turn, the pressure balance facilitates the reduction in stress on the forward and rear legs 140/142. The reduction in stress enables the first nozzle 126 to be mounted solely by the intermediate leg 144, and also permits the first nozzle 126 to be formed of relatively brittle material that can be readily fragmented by the fragmentation system 134. In this example, the gap G1 is larger than the gap G2. The difference in size corresponds to the difference in pressure in the regions near the gaps G1/G2. For instance, there is higher pressure near the forward lip 140a than at the rear lip 142a. The gap G1 is larger and thus less constrictive for the higher pressure flow.

As examples, the first nozzle 126 is formed of a brittle material selected from ceramic material and graphite. For instance, the first nozzle 126 is formed predominantly or only of ceramic or graphite. A ceramic is an inorganic, nonmetallic solid material that includes metal, nonmetal, or semi-metal atoms primarily in ionic and covalent bonds. Example ceramics for the first nozzle 126 are oxide ceramics, such as but not limited to zirconium oxide (ZrO$_2$).

Figure 4:
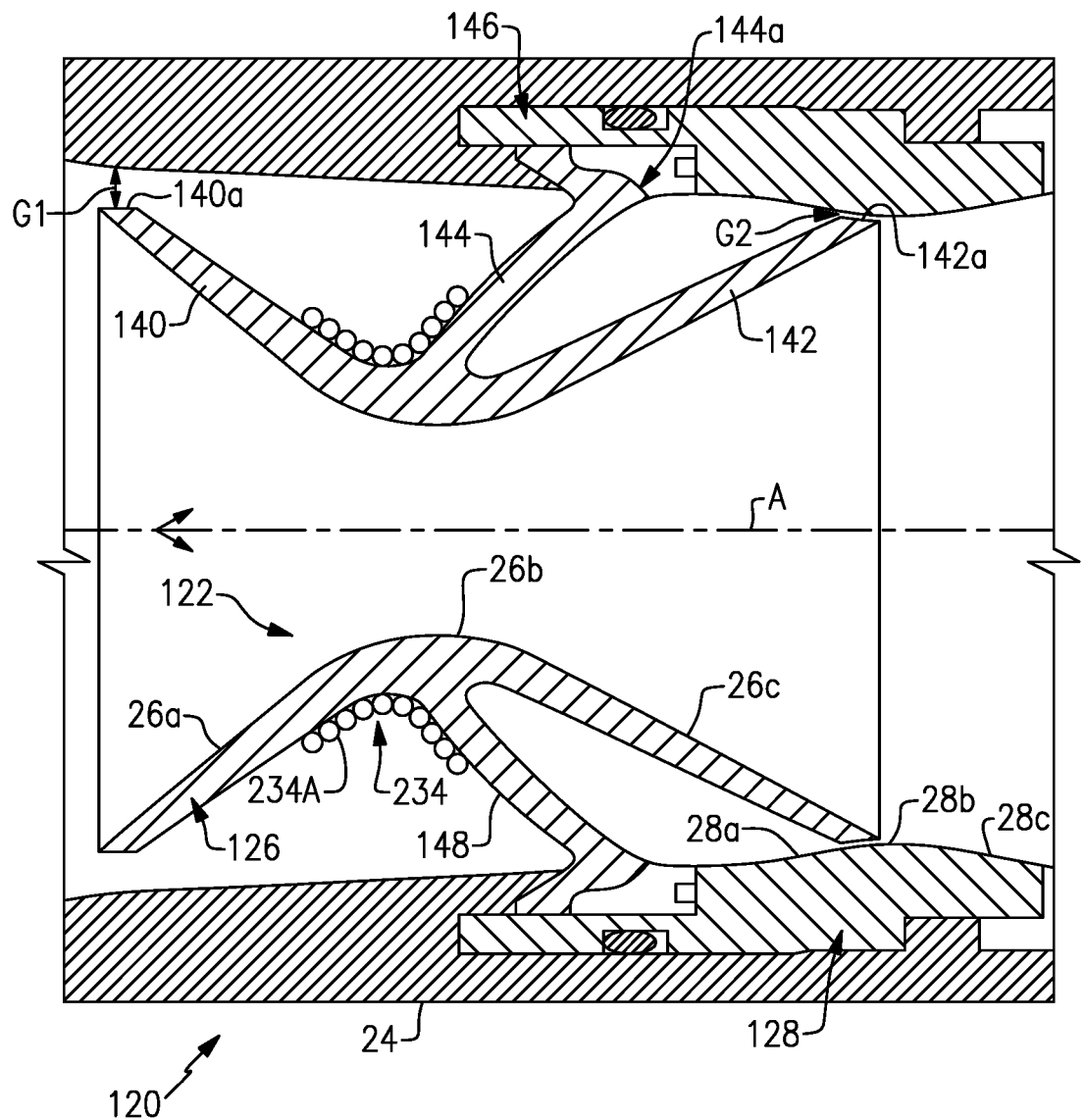
FIG. 4 illustrates a fragmenting nozzle system with an energetic material.

FIG. 4 illustrates a modified example of the rocket motor 120 and fragmenting nozzle system 122. In this example, the fragmentation system 234 includes an energetic material 234a disposed between the first and second nozzles 126/128, and the energetic material 234a abuts at least the intermediate leg 144. For example, the energetic material 234a is the ignition cord described above. In this example, the energetic material 234a is disposed between the forward and intermediate legs 140/144 and also abuts a portion of the forward leg 140. Additionally or alternatively, the energetic material can be arranged between the intermediate and rear legs 144/142. The close proximity of the energetic material 234a to the intermediate leg 144 ensures that the fragmentation system 234, once triggered, fragments the intermediate leg 144. Therefore, the first nozzle 126 is freed from attachment for discharge from the rocket motor 120 to expose the second nozzle 128. At least the intermediate leg 144 fragments, but the remainder of the first nozzle 126 or portions thereof may also fragment.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A nozzle system comprising:
   an outer nozzle;
   an inner nozzle radially within the outer nozzle and circumscribing an axis, the nozzle being formed of a brittle material and having a convergent leg, a divergent leg, a throat section that the convergent leg narrows to and the divergent leg expands from and an intermediate leg between the convergent leg and the divergent leg, the convergent leg and the divergent leg at least partially defining a flow passage through the nozzle; and
   an ignition system including an energetic material disposed along the intermediate leg and the convergent leg, wherein the energetic material produces a pressure wave upon activation, the pressure wave breaking apart the inner nozzle.

2. The nozzle system as recited in claim 1, wherein the intermediate leg has a convex conical surface.

3. The nozzle system as recited in claim 1, wherein the brittle material selected from the group consisting of ceramic materials, graphite materials, and combinations thereof.

4. The nozzle system as recited in claim 1, wherein the energetic material is in contact with the intermediate leg and the convergent leg and is radially adjacent the neck section.

5. A rocket motor comprising:
   a case;
   a nozzle system including first and second nozzles disposed in the case, the first nozzle at least partially disposed in the second nozzle, the first nozzle including:
      a forward leg, a rear leg, and an intermediate leg between the forward leg and the rear leg, wherein the intermediate leg has a convex conical geometry,
      wherein the forward leg is spaced radially away from the case such that there is a forward gap between a forward lip of the forward leg and the case,
      wherein the rear leg has a rear lip that is spaced from the case such that there is a rear gap between the rear lip and the case,
      the forward leg and the rear leg at least partially defining a flow passage through the first nozzle for gases to enter at the forward leg and exit at the rear leg; and
   wherein the first nozzle is exclusively secured by the intermediate leg to at least one of the case or the second nozzle,
   a fragmentation system, at least a portion of which is disposed between the first and second nozzles.

6. The rocket motor as recited in claim 5, wherein the forward gap is radially larger than the rear gap.

7. The rocket motor as recited in claim 5, wherein the intermediate leg has an intermediate lip that is axially closer to the rear lip than to the forward lip.

8. The rocket motor as recited in claim 5, wherein the first nozzle is formed of a material selected from the group consisting of ceramic materials, graphite materials, and combinations thereof.

9. The rocket motor as recited in claim 5, wherein the fragmentation system includes an energetic material disposed between the first and second nozzles.

10. The rocket motor as recited in claim 9, wherein the energetic material abuts the intermediate leg.

11. The rocket motor as recited in claim 9, wherein the energetic material is disposed between the forward leg and the intermediate leg.

12. The rocket motor as recited in claim 5, wherein the forward leg, the intermediate leg, and the second nozzle bound a void volume.

13. The rocket motor as recited in claim 5, wherein the fragmentation system includes an energetic material that is in contact with the forward leg and the intermediate leg.

14. The rocket motor as recited in claim 13, wherein the forward leg converges to a neck section, the rear leg diverges from the neck section, and the energetic material is radially adjacent the neck section.

15. The rocket motor as recited in claim 5, wherein the fragmentation system includes an energetic material that produces a pressure wave upon activation, the pressure wave breaking apart the first nozzle.

* * * * *